United States Patent [19]

Steiner

[11] Patent Number: 5,507,606
[45] Date of Patent: Apr. 16, 1996

[54] BACK SPOTFACING TOOL

[75] Inventor: Rudolph Steiner, Fairport, N.Y.

[73] Assignee: R. Steiner Technologies, Inc., Fairport, N.Y.

[21] Appl. No.: 433,821

[22] Filed: May 4, 1995

[51] Int. Cl.[6] .................................................. B23B 51/00
[52] U.S. Cl. ........................... 408/93; 408/187; 408/227; 408/713
[58] Field of Search .................. 408/54, 79, 80, 408/81, 93, 94, 180, 186, 187, 227, 231, 713, 147

[56] References Cited

U.S. PATENT DOCUMENTS

| | | | |
|---|---|---|---|
| 3,372,610 | 3/1968 | Johansson | 408/227 |
| 3,540,324 | 11/1970 | Johansson | 408/227 |
| 3,814,535 | 6/1974 | Steiner | 408/199 |
| 4,710,070 | 12/1987 | Alsen et al. | 408/227 |

FOREIGN PATENT DOCUMENTS 1552248  6/1969  Germany ........................ 408/227

*Primary Examiner*—Daniel W. Howell
*Attorney, Agent, or Firm*—Shlesinger Fitzsimmons Shlesinger

[57] ABSTRACT

Adjacent one end thereof the shank of a back spotfacing tool has therein a transverse slot, and a cutter mounting pin which extends between opposite sides of the slot parallel to the shank axis. A cutter has in one end thereof a U-shaped slot which is inserted removably over the pin to support the cutter for limited pivotal movement about the pin into and out of an operative position in which a flat, external, limit surface formed on the side of the cutter remote from the open end of its U-shaped slot engages the bottom of the slot in the shank to support the cutter for a cutting operation, and to prevent removal of the cutter from the pin. The cutter may be swung manually to an inoperative position in which the open end of its slot is positioned to permit removal of the cutter from the pin, or the replacement thereof over the pin.

11 Claims, 2 Drawing Sheets

BACK SPOTFACING TOOL

BACKGROUND OF THE INVENTION

This invention relates to back spotfacing tools, and more particularly to having a replaceable cutter, which permits the formation of a larger spotface diameter for a given pilot hole size.

In my U.S. Pat. No. 3,814,535, I disclosed a back spotfacing and counterboring tool of the type in which the spotfacing cutter is pivotal into and out of a recess in the tool shank between a retracted or inoperative position within the shank, and an extended position in which it is engagable with the work which is to be spotfaced. The advantage of such construction is that the cutter can be swung to its retracted position, and the tool with the retracted cutter can then be inserted through an opening or a pilot hole on a workpiece. As soon as the end of the tool bearing the cutter has passed through the workpiece, the cutter can be swung to its open or operative position, after which the rotating shank of the tool can be retracted operatively to engage the cutter with the surface of the workpiece which is to be back spotfaced. While such prior tool is very effective, the diameter of the spotface which can be produced by the tool is limited by the size of the cutter which can be retractably mounted in the tool.

To enable the production of larger spotface or counterbore diameters, certain prior art devices have utilized replaceable back spotfacing cutters, which are designed to be attached to the shank of a tool after the tool has been passed through an opening in the workpiece. The cutter is then attached to the tool shank, and the tool is then retracted to engage the cutter with the surface which is to be back spotfaced. After the spotfacing operation the tool is advanced and the cutter is removed to permit withdrawal of the tool out of the work.

One such prior art device employs a so-called bayonet-lock type of cutter having therethrough an axial bore for accommodating the shank of the tool. A pin which is fixed in the annular wall of the cutter to extend at its inner end part way into cutter bore, is engagable in a generally dogleg-shaped recess formed in the periphery of the tool shank, so that when the shank is inserted into the bore in the cutter and rotated, the projection in the bore becomes releasably seated in the inner end of the recess in the tool, thereby removably attaching the cutter to the tool. The tool can then be retracted to engage the cutter with a surface of the work which is to be back spotfaced. After a spotfacing operation has been completed, the tool is advanced and the cutter can be removed simply by rotating it slightly relative to the tool in a direction to disengage its projection from the inner end of the recess in the tool shank, thereby permitting removal of the cutter from the tool. Among the disadvantages of this bayonet-lock type of cutter is the fact that the associated tool must be operated at a relatively low cutting speed, therefore resulting in low productivity. Also the cutter requires frequent re-sharpening, and such cutter is not designed for forming interrupted or deep cuts in a workpiece.

Still another type of back spotfacer which employs a removable cutter is known as the block type. With this back spotfacer, the end of the tool shank that is to be inserted through an opening in the workpiece has therethrough a diametral slot, which is generally rectangular in configuration. After the slotted end of the tool has been inserted through the opening in a workpiece, a rectangular cutter, which is longer than the diameter of the tool shank, is inserted into the slot so that opposite ends of the cutter extend or project beyond diametrally opposite sides of the tool shank. A set screw is threaded into the shank to have its inner end engage in a recess in the cutter intermediate the ends thereof, thereby to fix the cutter against movement in the tool shank. The projecting ends of the cutter have cutting edges thereon which are engagable with the workpiece when the tool is retracted and rotated to form the back spotfacing in the workpiece. After the operation has been completed, the tool is advanced, the set screw is backed off, and the cutter is removed from the slot in the tool shank, thereby permitting the shank to be withdrawn from the workpiece.

This block-type of back spotfacer has the disadvantage that it also must be operated at low cutting speeds, and must be frequently resharpened. Moreover, a substantial amount of time is lost because of the need for employing a separate tool (a screwdriver or the like) for inserting and removing the cutter from the associated tool shank each time a workpiece is to be back spotfaced.

It is an object of this invention, therefore, to provide an improved back spotfacer of the type described which utilizes a replaceable cutter, which can be quickly and easily attached to, and removed from, the shank of a back spotfacing tool without requiring the use of any special tool or instrument for securing the cutter or releasing it from the tool shank.

Still another object of this invention is to provide an improved back spotfacer or counterboring tool having a readily removable and replaceable cutter, which is capable of being operated at high cutting speeds, and which is particularly suitable when the diameter of the desired back spotface exceeds a predetermined value.

A more specific object of this invention is to provide an improved back spotfacer tool of the type described having a removable cutter blade that is removably mounted on the associated tool shank in such manner that the inertia of the rotating tool tends to retain the blade securely on the tool, and in an operative position relative to the work which is to be spotfaced.

Another object of this invention also is to supply an improved tool of the type described in which the associated cutter may be designed for both front and back spotfacing.

Other objects of the invention will be apparent hereinafter from the specification and from the recital of the appended claims, particularly when read in conjunction with the accompanying drawings.

SUMMARY OF THE INVENTION

The shank of a back spotfacing tool, onto which a spotfacing cutter is to be mounted, is provided with a transverse slot having a plane bottom surface extending approximately diametrally of the shank, and a pair of spaced, parallel side walls lying in planes that extend normal to the axis of the shank. A pivot pin is fixed in the shank to extend transversely between the side walls of the slot parallel to the axis of the shank, and in radially spaced relation to such axis.

A back spotfacing cutter has therein adjacent the end remote from its cutting bit a generally U-shaped slot, which opens on the face of the cutter adjacent its cutting bit, and which extends transversely between opposite sides of the cutter. The rounded bottom of the U-shaped slot is seated coaxially against the pivot pin to support the cutter for limited pivotal movement about the pin between an operative position in which a flat, external surface on the adjacent end of the cutter engages the bottom of the slot in the shank to support the cutter for a cutting operation and to prevent removal of the cutter from the pin, and an inoperative position in which the open end of the slot is positioned to permit removal of the cutter from the pin, or the replacement thereof over the pin.

A resilient detent which is mounted in the shank to extend slightly beyond the bottom of the slot in which the cutter is mounted, is disposed to cooperate with a registering detent which protects from the pivotally mounted end of the cutter so that when the cutter is swung to its operative position the spring-loaded detent engages behind the detent on the cutter to hold the latter releasably in its operative position.

THE DRAWINGS

DETAILED DESCRIPTION OF THE PREFERRED EMBODIMENTS

Figure 1:
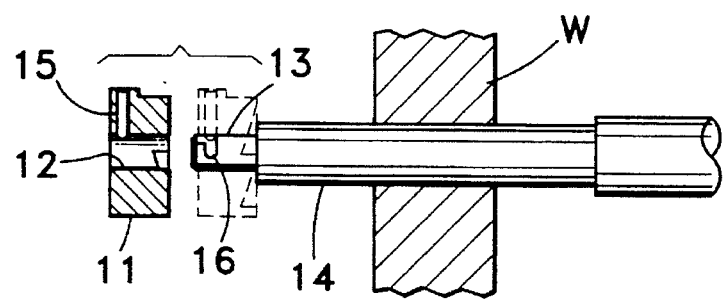
FIG. 1 is a fragmentary side elevational view illustrating in exploded form the above-noted prior art bayonet-lock type back spotfacer.
Figure 2:
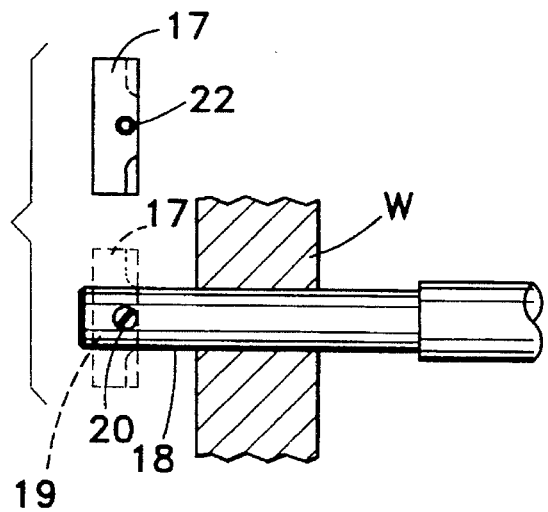
FIG. 2 is a fragmentary side eleveational view illustrating again in exploded form the above-noted prior art block type back spotfacer.

Referring now to the drawings by numerals of reference, FIGS. 1 and 2 illustrate the two above-noted prior art tools which employ removable back spotfacing cutters. The bayonet-type lock, as shown in FIG. 1, includes an annular cutter 11 having therethrough an axial bore 12 disposed to be inserted over the shank 13 of a tool 14, after the tool and its shank have been inserted through the opening in the workpiece W which is to be back spotfaced. A pin 15, which is fixed in the annular wall of the cutter 11 projects at its inner end part way into the axial bore 12 of the cutter. The end of the shank 13 onto which the cutter 11 is to be inserted, as shown for example by broken lines in FIG. 1, has in its outer peripheral surface a generally dogleg-shaped recess 16 having an axially extending portion which opens on the end of the shank facing the cutter 11, and at its inner end a transversely extending notch or locking section. When the cutter 11 is inserted over the shank 13 the inner end of pin 15 slides first into the axial extending portion of the recess 16, after which the cutter and tool shank are rotated slightly relative to each other to cause the end of pin 15 to become seated in the transversely extending section of notch 16, thereby securing the cutter 11 against axial movement on shank 13. To remove the cutter 11 the steps are reversed.

In the case of the block type back spotfacer, as shown in FIG. 2, the cutter 17 is rectangular in configuration and the shank 18 of the tool to which it is to be secured has therethrough a diametral slot 19. In use the tool 17 is inserted into the slot in shank 18, for example into the broken line position as shown in FIG. 2, after which a set screw 20 on shank 18 is threaded to engage in a registering recess 22 in the face of the cutter 17, thereby releasably to fix the cutter in the tool shank 18. To remove the cutter 17 from shank 18 it is necessary, of course, to use another tool, such as a screwdriver or the like to back off the set screw 20 so that the cutter 17 can be removed.

Referring now to FIGS. 3 to 6, 30 denotes generally an improved back spotfacing tool comprising a cylindrical shank 32 having rotatably mounted thereon a rotating pilot sleeve 33. Sleeve 33 is seated at one end (its left end in FIG. 3) against an external, circumferential shoulder 34, which is formed on shank 32 intermediate its ends. At its opposite end (the right end in FIG. 3) the sleeve 33 is secured by a retaining ring 35 against axial movement on shank 32. The pilot sleeve 33 is such that, when the tool 30 is inserted into the pilot hole or opening in a workpiece W, which is shown fragmentarily in FIG. 3, the pilot sleeve 33 supports the tool in the workpiece so that the shank 32 can be rotated relative both to the pilot sleeve 33 and the workpiece W.

Figure 3:
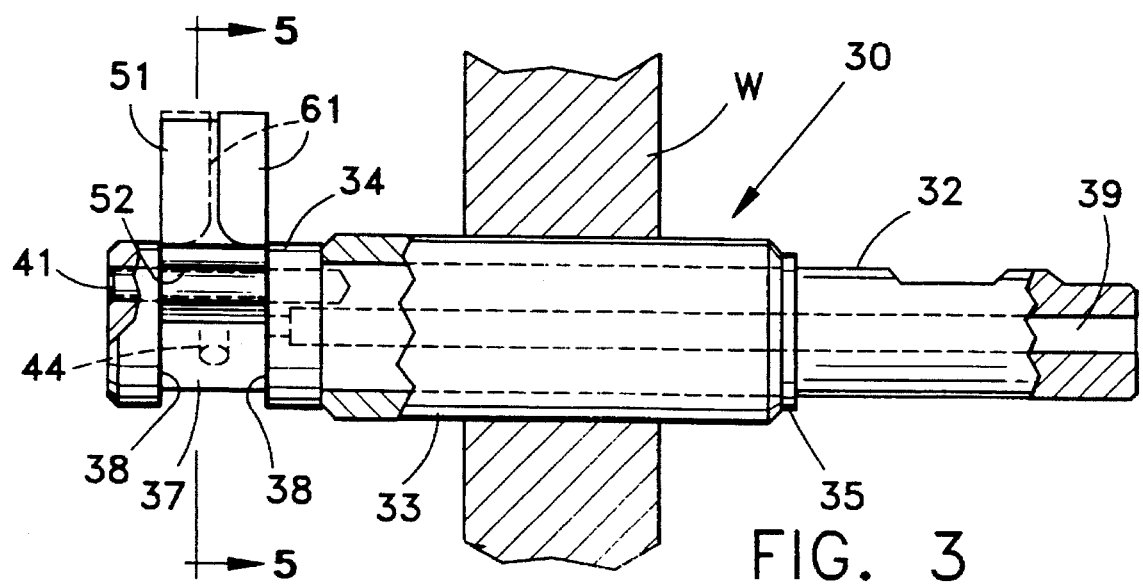
FIG. 3 is a side elevational view of an improved back spotfacer of the type made according to one embodiment of this invention, portions of the tool being broken away and shown in section, and the spotfacing cutter being shown in its operative position.

The portion of the shank 32 which projects beyond the left end of the pilot sleeve 33, as shown in FIG. 3, has formed therein intermediate its ends a transverse slot having a plane bottom surface or wall 37, which extends nearly diametrally of the shank 32, and spaced, parallel side walls 38, which lie in parallel planes that extend normal to the axis of shank 32. Shank 32 also has therein an axial bore 39 which opens at one end on the right end of the shank as shown in FIG. 3, and at its opposite end on one of the slot walls 38 for conveying a liquid coolant and/or lubricant to such slot.

Secured in the left end of shank 32 as shown in FIG. 3, and extending transversely between the slot side walls 38 in spaced, parallel relation to the axis of shank 32, is an elongate, rigid pivot pin 41 that may be made of steel or the like. As shown more clearly in FIGS. 4 to 6, in addition to being radially offset from the axis of shank 32, the pin 41 is also spaced from the slot wall 37. Pin 41 also is spaced from and in registry with a spherically shaped detent 43, which is mounted for limited movement in the inner end of a bore 44 which is formed in shank 32 to open at its inner end on the wall 37 approximately medially of the slot sidewalls 38, and which opens at its opposite end on the outer peripheral surface of shank 32. The inner end of opening 44 narrows slightly so that only a portion of the spherical detent 43 projects slightly into the slot beyond the bottom wall 37 thereof. A resilient element, such as a spring or a piece of rubber 45, which is positioned in the opening 44 rearwardly of the detent 43, is held against the detent by a set screw 46, or the like, which is adjustably threaded into the opening 44.

Figure 4:
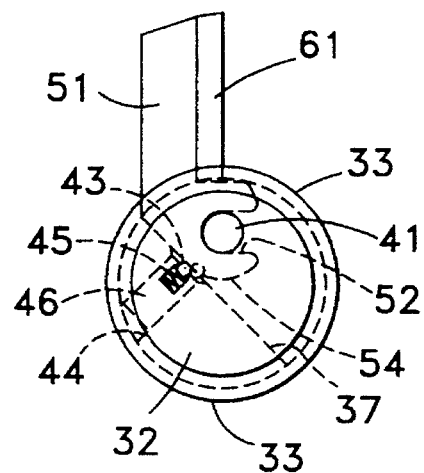
FIG. 4 is an end view of this tool as seen when looking at the left end of the tool as shown in FIG. 3, but on a slightly larger scale.
Figure 5:
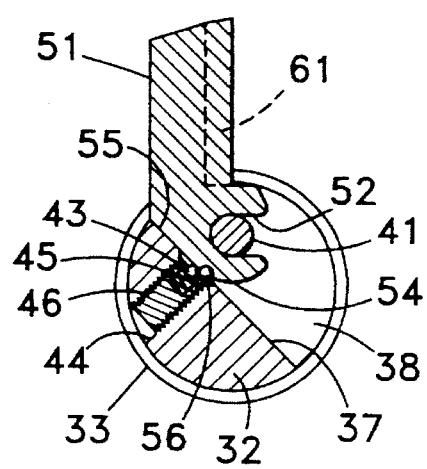
FIG. 5 is a sectional view taken generally along the line 5—5 in FIG. 3 looming in the direction of the arrows, but on the same scale as FIG. 4.
Figure 6:
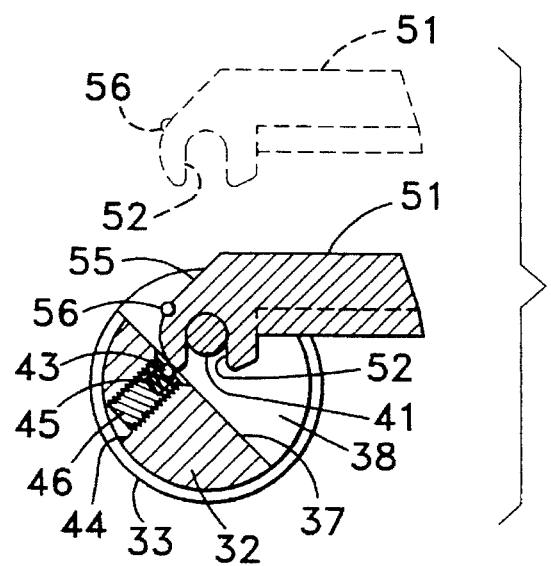
FIG. 6 is a sectional view similar to FIG. 5, but illustrating the position of the cutter on the tool when the cutter is initially inserted into the tool, or immediately before being removed from the tool.

Removably and pivotally mounted at one end thereof (the lower end in FIGS. 3 to 6) on pin 41 for pivotal movement between an upright, operating position as shown in FIGS. 3 to 5, and an inoperative position as shown in full lines in FIG. 6, is a back spotfacer cutter 51. Adjacent one end thereof, the lower end as shown in FIGS. 3 to 6, cutter 51 has in the face thereof a cutter mounting slot 52, which extends transversely between opposite sides of the cutter. Slot 52 is generally U-shaped in configuration, and has a rounded bottom which has a diameter approximately equal to that of the pivot pin 41, so that when the cutter 51 is mounted on pin 41 the pin seats coaxially in the bottom of slot 52. The lower end of cutter 51 beneath the slot 52, as shown in FIGS. 4 to 6, has formed thereon a rounded, arcuate surface 54, which is disposed to have near sliding, tangential engagement with the slot bottom wall 37 when the cutter 51 is swung between its operative and inoperative positions as shown in FIGS. 5 and 6, respectively. The curved surface 54 extends for approximately half the thickness of the cutter 51, and the other half thereof at the bottom of the cutter has formed thereon a flat surface 55, which is disposed to have coplanar engagement with the slot bottom 37 when the cutter 51 is positioned in its upright or operative position as shown in FIGS. 3 to 5. Secured in a recess in the bottom of cutter 51 approximately medially of its sides, and adjacent the juncture of surfaces 54 and 55, is a ball detent 56, only a portion of which projects outwardly beyond the curved surface 54 of the cutter.

Referring now to FIG. 6, in order to insert the cutter 51 into the tool 30, the cutter is positioned as shown for example by broken lines in FIG. 6, so that the slot 52 therein registers with the pin 41. The cutter 51 is then moved from its broken line to its solid line position as shown in FIG. 6, whereby the pin 41 becomes seated in the bottom of the U-shaped slot 52. At this time the spring-loaded detent 43 will have resiliently engaged the curved surface 54 on the cutter 51. The cutter 51 is then swung manually about the pin 41 (counterclockwise in FIG. 6) until the cutter reaches its upright, operative position as shown in FIGS. 4 and 5. During this swinging movement the detent 56 will have passed in a counterclockwise direction slightly beyond the resilient detent 43, and to the point where the plane surface 55 on the cutter will have engaged the slot bottom 37 to preclude any further counterclockwise rotation of the cutter 51 about pin 41. In this operative position of the cutter 51 it will be noted that the spring-loaded detent 43 engages that portion of the detent 56 which projects from the curved surface 54 of the cutter 51, and thus prevents any undesirable clockwise rotation of the cutter 51 about the pin 41. Thereafter upon retraction of the tool 30 toward the right in FIG. 3 relative to the work, the tool bit 61, which is secured in a conventional manner to the face of the cutter 51 above its slot 52, may be brought into working engagement with the surface of the work W which is to be back spotfaced.

After the spotfacing operation has been completed the tool 30 can be shifted axially back to the position as shown in FIG. 3, after which cutter 51 may be rotated manually in a clockwise direction from its upright position as shown in FIG. 5 to its inoperative position as shown in FIG. 6, from which position cutter 51 can be lifted off or upwardly from the pin 41 as shown in FIG. 6. During the pivotal movement of the cutter 51 from its upright position (FIG. 5) to its inoperative position (FIG. 6), the detent 56 urges the spring-loaded detent 43 rearwardly in the opening 44 in the shank far enough to permit the desired rotation of the cutter 51 from its operative to its inoperative position.

From the foregoing, it will be apparent that the present invention provides a relative simple and inexpensive means for considerably increasing the capability of a spotfacing tool to provide a back spotface the diameter of which can be made substantially larger than the diameter capable of being made by prior art back spotfacing tools. For example, because of the need for being able to swing a back spotfacing tool into and out of a recess on a tool shank of the type disclosed in the above-noted U.S. Pat. No. 3,814,535, it heretofore has not been possible to produce a spotface diameter in excess of about 2.2 times the diameter of the pilot or work hole to which the tool is inserted for spotfacing purposes. By using applicant's removable cutter, on the other hand, it is possible to produce spotfacing or counterbores having diameters that are greater than 2.2 times the diameter of the wore hole. Moreover, by using the open end in slot 52 for inserting the tool 51 onto and for removing it from the associated pin mounting 41, it is possible to insert and withdraw the cutter from the associated tool extremely rapidly, and without having to employ any additional tools for securing the cutter in or removing it from the tool. Also, the detents which retain the cutter releasably in its operative position, prevent undesirable chattering and gourging of wore surfaces, which was a problem with many prior art spotfacing tools.

While this invention has been illustrated and described in detail in connection with only certain embodiments thereof, it will be apparent that it is capable of still further modification. For example, although the cooperating detents 43 and 56 have been shown to be mounted, respectively, at the slot bottom 37 and at the lower end of the cutter 51, it will be readily apparent that the exact location of such cooperating detents can be altered without departing from this invention. Also, if desired, an additional cutting bit 61, as shown for example in phantom by the broken lines in FIG. 3, could be secured to the cutter to enable its use for both front and back spotfacing. It is intended, therefore, that this application cover any such modifications as may fall within the scope of one skilled in the art, or the appended claims.

I claim:

1. A tool, comprising
   a cylindrical shank attachable at one end to a tool spindle for rotation thereby, and having therein adjacent its opposite end a slot which extends transversely of the axis of said shank,
   a pin secured in said shank to extend transversely across said slot and parallel to said axis of the shank, and
   a cutter having therein adjacent one end thereof a generally U-shaped slot which opens on one side of said cutter,
   said U-shaped slot being slidably insertable over said pin releasably to mount said cutter on said shank for pivotal movement about said pin into and out of an operative position in which said cutter projects radially from said shank, and in which position a limit surface on said cutter at the side thereof remote from the open end of said U-shaped slot engages the bottom of said slot in said shank in said cutter, thereby to prevent removal of said cutter from said shank.

2. A tool as defined in claim 1, wherein said cutter is pivotal manually about said pin from said operative position to an inoperative position in which said limit surface on said cutter is swung away from said bottom of said slot in said shank, and said open end of said U-shaped slot is swung to a release position in which said U-shaped slot may be withdrawn from said pin thereby to permit removal of said cutter from said shank.

3. A tool as defined in claim 1, including means interposed between said shank and said cutter and operative releasably to secure said cutter in its operative position.

4. A tool as defined in claim 3, wherein said means for releasably securing said cutter in its operative position comprises cooperating detents on confronting surfaces of said cutter and said shank, respectively, said detents being releasably engaged with each other when said cutter is in its operative position, thereby to prevent pivotal movement of said cutter toward said inoperative position thereof.

5. A tool as defined in claim 4, wherein one of said detents is mounted in said shank to extend part way into said slot in said shank from said bottom thereof, and the other of said detents is mounted in said cutter to project part way from said side thereof remote from the open end of said U-shaped slot.

6. A tool as defined in claim 5, including means resiliently mounting said one detent in said shank for limited movement relative to said bottom of said slot in said shank.

7. A cutter for use with a tool shank of the type having a cylindrical pin extending transversely across a transverse slot formed in the tool shank adjacent one end thereof, comprising a cutter body having in one end thereof a generally U-shaped slot the outer end of which opens on one side of said cutter body, and the inner end of which defines on the cutter body a curved surface having a radius only slightly greater than the radius of said cylindrical pin, and a cutting bit secured to said one side of said cutter body adjacent said outer end of said U-shaped slot, said U-shaped slot being insertable via its open, outer end over said cylindrical pin removably to mount said cutter body on said tool shank for pivotal movement about said pin into and out of an operative position in which said cutting bit extends radially outwardly from said tool shank, and said cutter body having on the side thereof remote from the outer end of said U-shaped slot a flat limit surface lying in a plane extending transversely of a plane containing the centerline of said U-shaped slot, and disposed to have coplanar engagement with the bottom of said slot in said tool shank, when said cutter body is in its operative position.

8. A cutter as defined in claim 7, including a detent mounted in a recess in said cutter body and having a portion thereof projecting from said body to extend into said slot in said tool shank for registry with a cooperating detent on said shank, when the cutter body is mounted in its operative position on said shank.

9. A cutter as defined in claim 8, including a second cutting bit secured on said one side of said cutter body adjacent to and in registry with the first-named cutting bit.

10. In a back spotfacing tool having a tool shank, and a cutter mounting pin secured in said shank to extend parallel to the axis of said shank between opposite sides of a transverse slot formed in said shank adjacent one end thereof, a spotfacing cutter, comprising a cutter body having a cutting bit secured to one side thereof, said body having in one end thereof a generally U-shaped slot having an outer end opening on said one side of said body adjacent said cutting bit, and having a rounded inner end removably disposed in coaxial engagement with said mounting pin, said cutter body being pivotal manually about said pin to an operative position in which said cutting bit extends radially outwardly from said shank, and said outer, open end of said U-shaped slot faces away from the bottom of the slot in said shank, and said cutter body having thereon at the side thereof remote from said open end of said U-shaped slot a flat surface which engages the bottom of said slot in said shaft, when said cutter body is in its operative position, thereby operatively to prevent said inner end of said U-shaped slot from becoming disengaged from said pin.

11. In a tool as defined in claim 10, wherein said cutter body is pivotal manually about said pin from said operative position to an inoperative position in which said open end of said U-shaped slot is swung far enough toward said bottom of said slot in said shank to enable said U-shaped slot to be disengaged from said pin, thereby to remove said cutter body from said shank.

* * * * *